United States Patent [19]

Röllin et al.

[11] Patent Number: 5,685,662
[45] Date of Patent: Nov. 11, 1997

[54] CONNECTING ELEMENT

[75] Inventors: Ulrich Röllin, Zürich; Peter Kreuzwirth, Spreitenbach, both of Switzerland

[73] Assignee: Alusuisse-Lonza Services Ltd., Neuhausen am Rheinfall, Switzerland

[21] Appl. No.: 503,849

[22] Filed: Jul. 18, 1995

[30] Foreign Application Priority Data

Jul. 25, 1994 [CH] Switzerland .................. 2335/94

[51] Int. Cl.$^6$ .................................................. F16B 9/02
[52] U.S. Cl. ................................. 403/231; 403/403
[58] Field of Search .......................... 403/230, 231, 403/382, 403

[56] References Cited

U.S. PATENT DOCUMENTS

| | | | |
|---|---|---|---|
| 2,601,164 | 6/1952 | Montgomery | 403/231 X |
| 3,375,029 | 3/1968 | Fry et al. | 403/230 |
| 3,375,030 | 3/1968 | Thompson | 403/231 |
| 3,429,601 | 2/1969 | Bremers | 403/230 |
| 3,451,183 | 6/1969 | Lespagnol et al. | 403/230 X |
| 3,559,357 | 2/1971 | Lowe | 403/230 X |
| 4,069,638 | 1/1978 | Hasselqvist et al. | 403/231 X |
| 4,071,990 | 2/1978 | Traber | 403/231 X |
| 4,513,554 | 4/1985 | Johnson et al. | 403/231 X |
| 4,843,775 | 7/1989 | Armstrong et al. | 403/231 X |
| 4,867,420 | 9/1989 | Anderson | 403/403 X |
| 5,116,161 | 5/1992 | Faisst | 403/231 |
| 5,461,837 | 10/1995 | Chaney et al. | 403/297 X |
| 5,498,099 | 3/1996 | Scheuer | 403/231 X |

FOREIGN PATENT DOCUMENTS

| | | | |
|---|---|---|---|
| 0136264 | 4/1985 | European Pat. Off. | |
| 2119246 | 8/1972 | France | 403/230 |
| 2518192 | 6/1983 | France | 403/403 |
| 2562174 | 10/1985 | France | 403/230 |
| 2641809 | 7/1990 | France | |
| 3823941 | 1/1990 | Germany | |
| 54-26042 | 2/1979 | Japan | 403/230 |
| 3-199705 | 8/1991 | Japan | 403/231 |
| 627982 | 2/1982 | Switzerland | |
| 919135 | 2/1963 | United Kingdom | |
| 1579941 | 11/1980 | United Kingdom | 403/230 |

*Primary Examiner*—Blair Johnson
*Assistant Examiner*—Andrea Chop
*Attorney, Agent, or Firm*—Bachman & LaPointe, P.C.

[57] ABSTRACT

Connection of two longitudinal sections (10, 22) that are at an angle to each other, each longitudinal section (10, 22) having two connecting sides (12) and two wall sides (14), where at least one connecting side (12) of each section (10, 22) exhibits a groove (24) that is undercut on both sides and on both sides of the undercut groove (24) an integral longitudinal flange (30). The first longitudinal section (10) exhibits a transversely cut section face, the end face (16) of the first longitudinal section (10) which is secured at an angle to a connecting side (12) of the second longitudinal section (22). The first longitudinal section (10) exhibits a recess (18) at its end (16) in which a connecting element (60), introduced into the groove-like recess (34) between the longitudinal flanges (30) in the second longitudinal section (22), engages—as a result of which the connecting element (60) forms a mechanical joint by virtue of fit with the end recess (10). A connecting mass (54) for sealing the joint or to achieve an exact fit mechanical joint may be provided between the connecting element (60) and the end recess (18) of the first longitudinal section (10) and/or between the connecting element (60) and the longitudinal flange (30) of the second longitudinal section (22). The connection is particularly suitable for assembly of frame-type structures of longitudinal sections (10, 22) for the superstructures of road and railway vehicles.

15 Claims, 4 Drawing Sheets

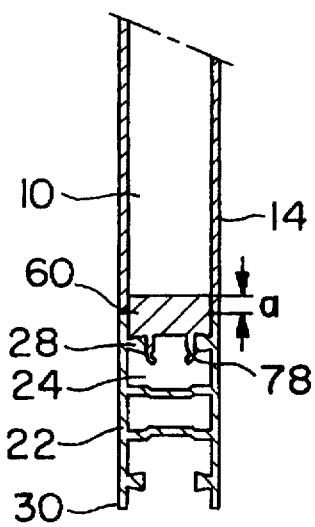 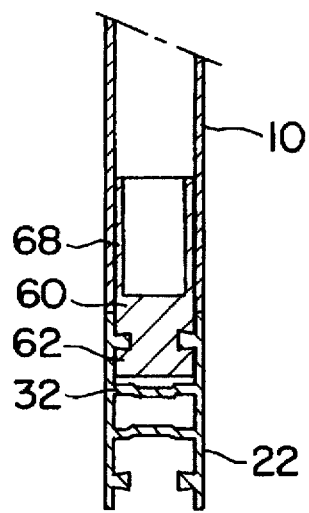 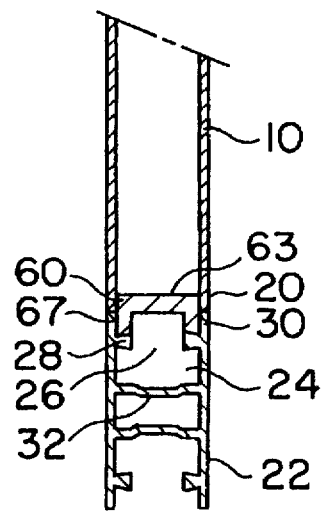
FIG. 4A  FIG. 4B  FIG. 4C
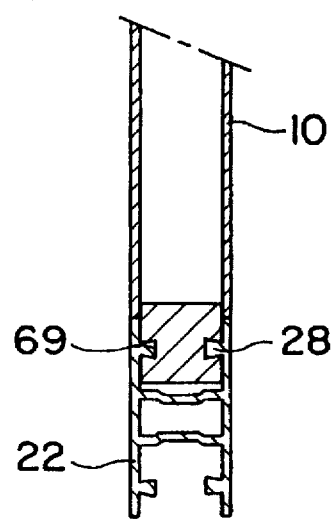 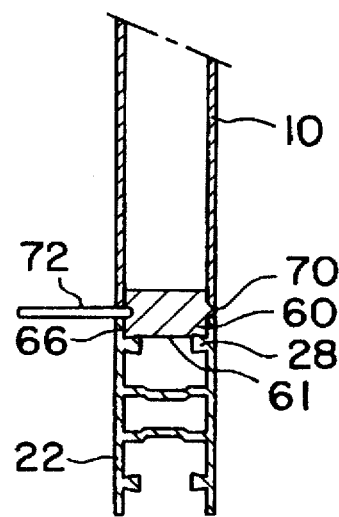
FIG. 4D  FIG. 4E

CONNECTING ELEMENT

BACKGROUND OF THE INVENTION

The present invention relates to a connection between two longitudinal sections that are at an angle to each other, each section having two connecting sides and two wall sides, where at least one connecting side of each longitudinal section exhibits a groove that is undercut on both sides and an integral longitudinal flange on both sides of the undercut groove, the first longitudinal section being cut transversely and this transversely cut section face forms the end of the first longitudinal section which is secured at an angle to a connecting side of the second longitudinal section. The invention relates further to a process for manufacturing the connection and the use of the connection.

Connections of the above mentioned kind are employed from example in the assembly of frame-type structures for vehicle superstructures e.g. on road and railway vehicles. The structural components are usually made of steel, aluminum or plastic sections, complemented e.g. by shaped steel or aluminum sheets or panels of plastic or if desired plastic or glass segments. Such structural components are in particular made of extruded aluminum, plastic or steel sections.

Connection means for light metal sections utilizing shape and/or friction joining are known. From the Swiss patent CH 627 982 connections based on friction joining of metal sections with the aid of corner connecting pieces are known especially for the assembly of frame-type structures for superstructures of road and railway vehicles. The described corner connecting pieces feature integral spring like parts that are introduced into undercut grooves in the metal sections and secured by screws. The screw connections contain clamping pieces which are introduced into the undercut grooves in the metal sections and then tilted into the undercut parts of the section.

In the connection described in CH 627 982 forces are transferred from one section to the other essentially via the angle piece; often and especially in the case of thin walled sections, this does not provide optimum transfer of forces. Further, in many applications one longitudinal section is often joined to the end of another cross-cut section. In such cases it is necessary to have a clean dividing line at the cut across the latter section. The subsequent working or machining of the cut section end is time consuming and expensive. Further, thin walled sections cannot be well sealed as e.g. filling with a filler material is not possible because there is no proper contact at the joint.

Described in patents DE, A, 38 23 941, GB, A, 919 135 and FR, A, 2 641 809 are nodal joints of pairs of hollow longitudinal sections that are rectangular in cross-section, where the end of one section meets a long face of the other section. Thereby, a square shaped part is inserted into undercuts on the outside of the second section and the end of the first section pushed over the square shaped part so that the square shaped part engages in the end of the first section. The transfer of forces from one section to the other in this known connection is essentially via the outside of the section.

In order to prevent the first section from sliding in the axial direction, the connection according to DE, A, 38 23 941 exhibits deformations in the section wall which engage the square shaped part in recesses. In the case of GB, A, 919 315 and FR, A, 2 641 809 the same effect is achieved by friction, welding or by screwing the first section to the square shaped part.

The present state of the art is such that known connection means are not suitable for joining the end of one longitudinal section e.g. of small cross-section to the long side of another longitudinal section, as the mechanical stability of such a connection is normally inadequate. Further, in the case of known connections, the end of the first longitudinal section lies on the long side of the second longitudinal section so that in such connections, in order to accommodate large forces, the surfaces to be joined have to be of a very high standard.

SUMMARY OF THE INVENTION

The object of the present invention is to create a connection between a pair of longitudinal sections at an angle to each other, whereby the above mentioned disadvantages are avoided and in particular requires no subsequent working of the cross-cut section and permits tight joints to be made also with thin walled sections.

That object is achieved by way of the invention in that the first longitudinal section exhibits a recess at its end and a connecting element, that is introduced into the groove-like recess between the longitudinal flanges in the second longitudinal section, engages in this recess as a result of which the connecting element forms a mechanical joint by virtue of fit with the end recess.

The connecting element comes to rest between the end face of the first longitudinal section and a connecting side of the second longitudinal section, the connecting element having a positively shaped configuration and the first longitudinal section an end recess with a negatively shaped configuration. The positively shaped configuration of the connecting element and the negatively shaped configuration resulting from the end recess complement each other and in doing so provide a mechanical joint by virtue of shape by means of which forces are transferred from one section to the other via the outer planes of the section and via the inner end region of the first longitudinal section. In addition, by way of the connection according to the invention the manufacturing tolerances of the abutting faces compensate for each other, which makes it possible to provide tight joints.

BRIEF DESCRIPTION OF THE DRAWINGS

The present invention is explained in greater detail by way of example with the aid of FIGS. 1 to 4.

FIG. 4 shows the end view of that shown in FIG. 1 with various kinds of connecting elements as seen along section IV—IV in FIG. 1.

DETAILED DESCRIPTION OF PREFERRED EMBODIMENTS

Figure 1:
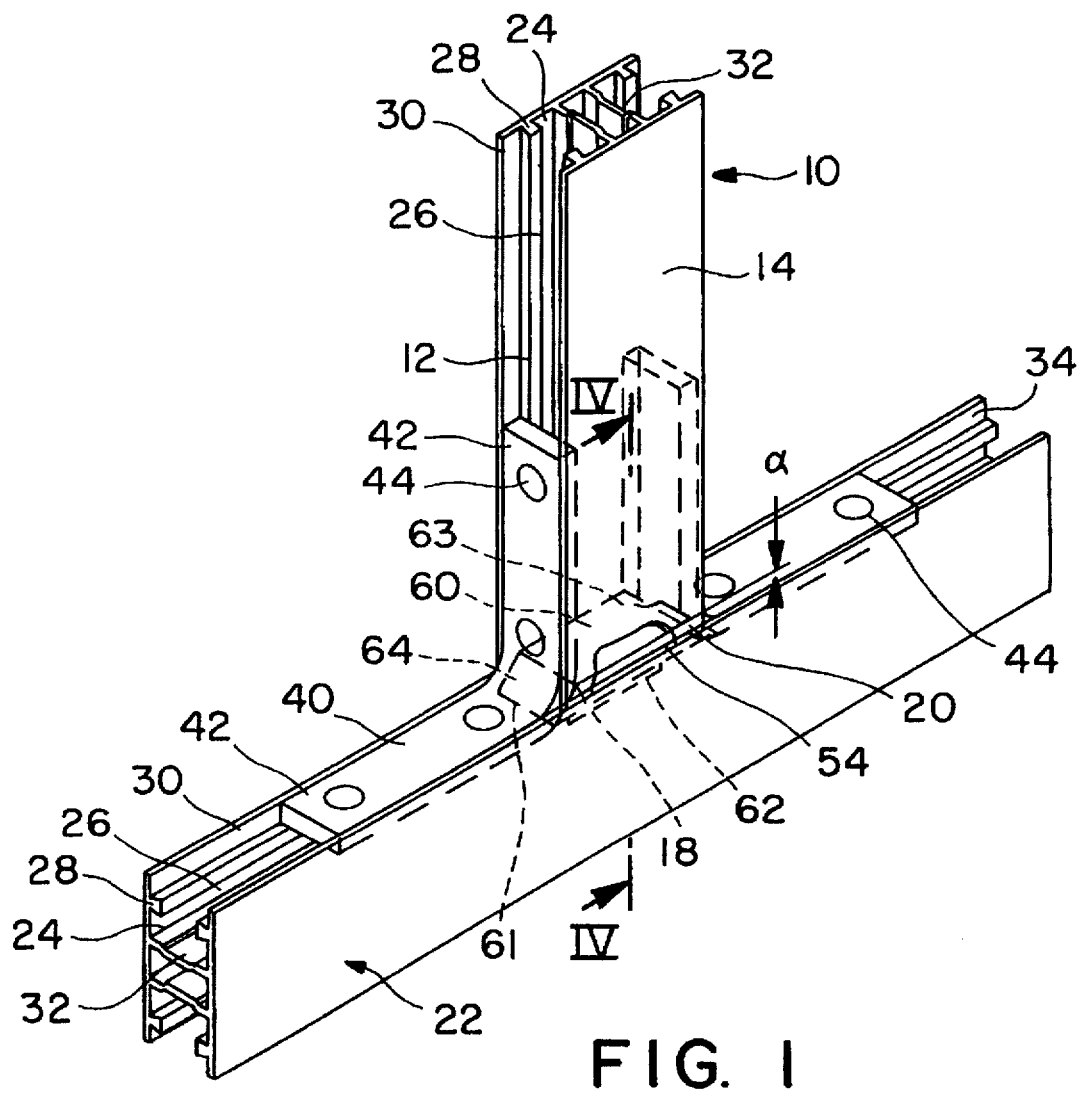
FIG. 1 shows a perspective view of a connection according to the invention of two extruded sections that are perpendicular to each other.

The longitudinal sections to be joined are normally made of steel, plastic or light metals e.g. aluminum or its alloys. The connections presented here are preferably used for joining extruded sections of aluminum or its alloys.

The connection according to the invention are suitable for long sections that preferably feature on one side, the so-called joining side, an undercut groove with a longitudinal opening and on both sides of the undercut groove an integral longitudinal flange. In the following, the recess formed in the longitudinal section as a result of the undercut groove longitudinal flange will be referred to as the groove-like recess. Also the sides of the section adjacent to the joining sides will be referred to as the wall sides.

In a simple version of the longitudinal section the longitudinal flanges is part of the wall sides, the undercut of the undercut groove forming integral strips. At a distance from the section strips struts may be provided that on the side towards the strips frame in the undercut groove.

It is preferred to join together longitudinal sections that have the same cross-section. Preferred for the connection according to the invention are longitudinal sections that exhibit on the undercut groove integral longitudinal flanges on the joining side that have the same spacing. In a simple longitudinal section in which the longitudinal flanges are part of the wall sides, the requirement of same spacing for the flanges also the requirement for equal spacing for the wall sides.

For the connection according to the invention the longitudinal sections may be a right angle (butt joint) or any desired acute angle (sloping joint). Preferred, however, is the joining of two longitudinal sections at a right angle. If the sections to be joined have to be made with a sloping joint, the end face of the first longitudinal section is preferably prepared, instead of at right angles, such that the end face forms the same angle as that which the end face forms with the second longitudinal section.

In the first longitudinal section, the end recess which is required according to the invention, may concern only a part of the end or the whole of the end part lying between the wall sides of the first section. The end recess preferably concerns the whole of the end part lying between the wall sides of the first section so that essentially the section strips and if desired the section struts in the end region of the first section are affected by the end recess. Forming a recess at the end of the first longitudinal section results in end flanges being created at the recess, especially on the wall side. If the end recess concerns the whole of the end region between the wall sides, then the end flange is formed by the projecting parts of the end wall of the first longitudinal section.

The end flanges formed by the end recess is preferably at least 2 mm in height, in particular between 2 and 5 mm.

The end recess exhibits a negative curvature as seen in profile, preferably purely concave in form. Further, it is shaped in such a manner that, together with the positive profile of the connecting element, it enables an interfacing shape-endowed mechanical connection to be achieved by virtue of fit. The connecting element is preferably purely convex in shape. However, the present invention also embraces connections in which the end recess and the connecting element exhibit e.g. a perfect tongue and groove type of fit in order e.g. to improve the tightness of the connection or the transfer of forces there. In the present text the expression, shape-endowed mechanical connection, is not to be understood only as providing an end recess with an exact fit to the outward projecting part of the connecting element; more importantly, to be understood by this are also the essentially exact fit connections between the above mentioned parts that e.g. permit a tightly sealed or mechanical, shape-endowed joint to be formed by virtue of fit by introducing a joining mass between the connecting element and the end recess. Furthermore, by shape-endowed design of the end recess and the connecting element is always to be understood the shape-endowed design of both of these parts with the connecting element set into the groove-like recess, so that in terms of the shape-endowed design of the connection, apart from the end recess, only the part of the connecting element that projects beyond the longitudinal flange of the second section is affected.

In a preferred example of the connection according to the invention a joining mass for sealing the joint or for creating an exact connection between the connecting element and the end recess by virtue of shape is provided between the connecting element and the end recess in the first longitudinal section and/or between the connecting element and the longitudinal flange on the second longitudinal section.

The joining mass may e.g. be an adhesive mass, a seal, a filler or a weld, braze or solder seam. The adhesive mass may be e.g. an acrylic or cyanide type adhesive, or a single or two component polyurethane or epoxy adhesive. Seals may be of natural materials such as cork or the like or of plastics or elastomers such as rubber, caoutschouc or thermoplastics. Fillers are e.g. sealing masses based on bitumen, plastic or oil based materials; after a length of time these harden to a more or less elastic mass, at the same time retaining a certain amount of plasticity. A weld seam may be created e.g. by fusion welding, welding via electric gas discharge, electro-beam welding, laser welding or by metal inert gas (MIG) welding or tungsten inert gas (TIG) welding.

The connecting elements may in principle be of any design complementing the end recess. Preferred connecting element bodies are for example oblique or straight rectangular blunted pyramids and oblique or straight cylinders with e.g. a rectangular base area and at the same time in particular a body in the shape of a spade or parallelepiped. The side of the connecting element set into the groove-like recess is designated the base, the opposite face the top and the sides of the connecting element facing the wall sides of the second longitudinal section as end faces on the wall side and the sides lying in the direction of the groove-like recess as the end faces on the connection side. The top surface of the connection element may be flat or bulging and may come to lie parallel to the base or inclined with respect it.

The height of the end faces of the connecting element on the wall side is usefully greater than the height of the corresponding longitudinal flange on the second longitudinal section. The height of the connecting element end face on the wall side in question is preferably greater by at least 1.5 mm, in particular 1.5 to 4.5 mm, greater than the height of the corresponding longitudinal flange. This difference in height between the connecting element and the corresponding longitudinal flange is hereinafter referred to as the extra height of the connecting element.

If the height of the end flange is less than the extra height of the connecting element, then the first longitudinal section is supported at least partly by the end faces of the section struts, strips or longitudinal flanges on the top face and/or the end faces of the connecting element. If the height of the end flanges is greater than the extra height of the connecting element, then the first longitudinal section is supported by the end faces of the wall sides or the end flanges of the cross-cut longitudinal section are supported on the longitudinal flanges of the longitudinal section.

The connecting elements may be e.g. of steel, plastic or light metals such as aluminum or its alloys. The connecting element is preferably made of the same material as the longitudinal sections or out of a material with a similar coefficients of thermal expansion as the longitudinal sections. To improve the tightness of the seal at the connection according to the invention, the material for the connecting element may if desired be selected such that the smallest possible thermomechanical stresses arise between the connecting element and the joining mass to be employed.

The connecting elements may be manufactured e.g. by casting, extrusion molding or forging. The final shape may be achieved e.g. by chip-forming, mechanical processes such as milling.

The breadth of the connecting elements may be selected such that they can reside in the groove-like recess with sliding fit, or they may be secured in place in the groove-like recess e.g. by clamping, plugging, wedging, clipping in, by latch fit, bracing, screwing, riveting or by soldering, welding or adhesive bonding.

The faces of the connecting element on the wall side may run parallel to the wall sides of the longitudinal sections, the breadth of the connecting element being e.g. 5 to 100 μm smaller than the distance defined by the end flanges of the first longitudinal section.

In order to ensure a tight connection is achieved, the length of the connecting element at the top face is usefully the same as the length of the end face of the first longitudinal section.

In a preferred version of the connection according to the invention angle pieces are introduced into at least part of the groove-like recess in the longitudinal sections in order to provide reinforcement for the connecting sides of the longitudinal sections; each angle piece features two arms at an angle to each other and each arm is secured by at least one clamp-screw connection means to the related connecting side of the longitudinal section; each screw engages in a thread of a retaining element such as e.g. a clamping platelet that can be introduced from the front into the undercut groove and each arm of the angle piece exhibits at least one hole to accommodate the screw(s) engaging in the thread(s) of the clamping platelet(s).

The arms of the angle piece may also exhibit a spring-like integral projection that can be introduced into the undercut groove of the longitudinal section.

The clamp-screw connections may already be secured in place on the corresponding angle piece arms before introducing the angle piece into the groove-like recess in the longitudinal sections. On fitting the longitudinal sections together with the angle piece, the springs of the angle piece are pushed into the undercut groove in the longitudinal section and the clamping pieces introduced in the longitudinal direction into the groove opening. As the clamping platelet features a threaded hole in which a screw passing through the angle piece engages itself, the platelet can be tilted into the undercut region simply by turning the screw. The thickness of the arms of the angle piece can be chosen such that holes for the screws can be countersunk and screws with countersunk heads employed. The thickness of angle piece necessary for this may also be achieved by means of a pronounced spring-like projection. The clamp-screw connection is therefore tightened solely from the outer side of the angle piece so that no counter-holding tool is necessary for the clamping platelet.

The clamping platelets may exhibit on the side facing the strips on the longitudinal sections, wedging faces that correspond to wedging areas on the section strips. On tightening the clamping platelet the platelet centres itself by mutual contact and possibly by the sliding movement of the wedge faces of clamping platelet and section strips.

The clamping platelets may be e.g. in the form of a parallelogram, the larger diameter of the clamping platelet being greater than the width of the longitudinal groove. Consequently, when the clamping screw is tightened, the clamping platelet becomes wedged automatically to the inner wall of the longitudinal groove, with the result that rotation of the clamping platelet is prevented.

A specially preferred version of the connection according to the invention is achieved in that the faces of the connecting element on the connection side exhibits a shape that correlates congruently to the bend in the angle piece i.e. a shape that fits to the rounded form or a shape that is complementary to the curve on the angle piece.

In a preferred version the connecting element is in the form of a U-shaped longitudinal section with downward projecting flanges. Such U-shaped connecting elements can be arranged with downward projecting flanges on the section strips of the second longitudinal section or with the top face on the section strips.

In another preferred version the connecting element exhibits on its base a spring-shaped projection that can be introduced into the undercut groove of the second longitudinal section.

In a further preferred version the connecting element exhibits a groove on both wall side faces so that the connecting element with said groove can be pushed into the undercut groove formed by the section strips in the second section.

The connecting element may also exhibit lug-shaped projections on its faces adjacent to the wall sides. As a result this increases the surface area, in particular the surface area available transferring forces from one longitudinal section to the other.

In order that other structural elements than longitudinal sections may be attached to the connection according to the invention, a further advantageous version of the connecting element may be such that a bulge-shaped projection is provided on one of its wall side faces and an integral support bracket on the other, opposite-lying wall side face. The bracket may for example exhibit one or more attachment openings. Forces acting on the component attached by means of the bracket and the connection according to the invention are transferred directly into the connection.

The invention relates also to a process for manufacturing the connection according to the invention in which a connecting element is introduced into the groove-like recess of the second longitudinal section and is positioned at the intended place in the second longitudinal section, the angle piece(s) pushed into the groove-like recess and temporarily secured in place, the whole of the thus prepared connection provided with a connecting mass and the first cross-cut longitudinal section pushed into the free-standing arm of the temporarily fixed angle piece(s) and the angle piece(s) permanently affixed to the longitudinal section that is to be attached by tightening the clamp-screw connections. A connection made this way may be subjected to mechanical loading immediately after it has been made as the forces acting on a longitudinal section are transmitted to the other longitudinal section via the angle piece.

The connections according to the invention are particularly suitable for the assembly of frame structures out of longitudinal sections, for example for the superstructures of road or railway vehicles or for the assembly of other superstructures out of longitudinal sections e.g. cabins for operators of cranes, farming or municipal transport vehicles, such superstructures made up of frame-like structures are normally still clad with further structural parts such as steel or aluminium sheet, glass segments or panels made of plastic. In addition, such a frame-type structure may be closed on the outside e.g. with doors. An interior or exterior cladding may be attached e.g. by means of screws, rivets or adhesive bonding or interlocking hook-type fastener parts. The interlocking hook-type fastener parts may be laminated on or adhesively attached.

FIG. 1 shows a perspective view of a connection according to the invention between a first transverse-cut longitudinal section 10 and, at right angles to section 10, a second longitudinal section 22. The longitudinal sections exhibit on each of two facing sides, the connecting sides 12, an undercut groove 24 on both sides, each with a longitudinal opening 26 and on both sides of the groove a longitudinal flange 30. Projecting strips 28 are formed as a result of the undercut groove. The groove-like recess 34 in the second longitudinal section 22 formed by the projecting strips and the longitudinal flange serves to accommodate and align the connecting element 60 and the angle piece 40. The section strut 32 is situated a distance from the projecting strips 28. The cross-sectional end of the second longitudinal section 22 which is to be joined to the first longitudinal section 10 features a recess 18 which is designed such that it connects by virtue of fit to the connecting element 60.

The connecting element 60 shown in FIG. 1 features on the base 61 of the connecting element 60 an integral spring 62 which engages in the longitudinal opening 26 of the undercut groove 24. The base 61 of the connecting element 60 is supported by projecting strips 28 of the longitudinal section 22. Further, the connecting element 60 is aligned in the longitudinal opening 26 of the longitudinal section 22 by means of the spring 62.

The connecting element 60 mounted in the longitudinal section 22 projects a height a over the outer edge of the longitudinal flange 30 on section 22, the height a amounting to the difference in the heights of the connecting element 60 and the longitudinal flange 30. The recess 18 at the end of the longitudinal section 10 concerns the projecting strips 28 and the struts 32 in the end region of section 10. As a result of this recess 18, end flanges 20 are formed at the wall sides 14 of the longitudinal section 10. If the height of the end flange 20 is less than the extra height a of the connecting element 60, then the first longitudinal section 10 is supported at least in part by the end faces of the struts 32 and strips 28 created by the recess 18, viz., supported on the top surface 63 of the connecting element 60. If the height of the end flange 20 is greater than the extra height a of the connecting element 60, then the first longitudinal section 10 is supported by the end flange 20 on the longitudinal flange 30 of the longitudinal section 22.

In the connection shown in FIG. 1 the longitudinal sections 10, 22 that are joined by means of the connecting element 60 are secured in a mechanically rigid manner by two angle pieces 40. The angle pieces 40 shown in FIG. 1 are in width exactly the same as the distance between the flanges 30. The angle pieces 40 may also exhibit (not shown here) a spring-like part on their arms 42 which engages in the longitudinal opening 26 of the undercut groove 24. In the case of the angle piece 40 shown in FIG. 1 the thickness of the arms 42 corresponds to the height of flange 30 so that the upper edge of the arms 42 lie flush with the upper edge of the longitudinal flange 30. Connecting mass 54 shown in FIG. 1 may be provided for sealing the joint or to achieve an exact fit mechanical joint between the connecting element 60 and the end recess 18 between the connecting element 60 and the end recess 18 of the first longitudinal section 10 and/or between the connecting element 60 and the longitudinal flange 30 of the second longitudinal section 22.

Each arm 42 of the angle piece 40 is attached to the corresponding connecting sides 12 of the longitudinal sections 10, 22 by means of two clamp-screw connections. Each arm 42 features therefore two holes 44 that are spaced apart and are provided to accommodate screws that engage in the threads of clamping platelets.

The interaction of the end flange 20 and the connecting element 60 provides the connection with sideways stability and permits forces acting sideways on one section to be transferred to the other section—even in the case of thin-walled longitudinal sections. A further essential element of the connection according to the invention is that the interaction of the connecting element 60 with the end flange permits corner connections to be fabricated that are covered at the sides and thus the production of frame-type structures e.g. for vehicles.

Figure 2:
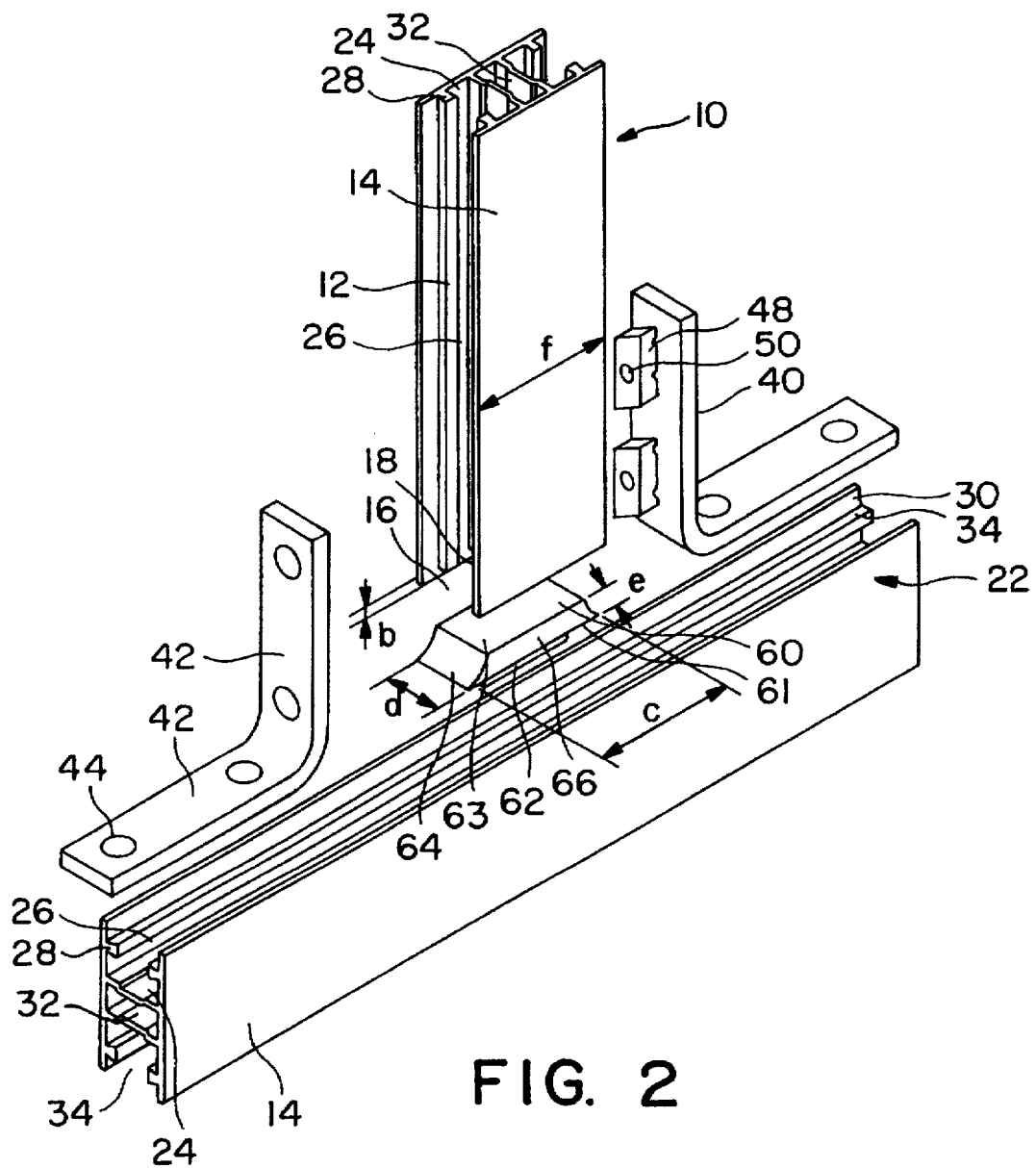
FIG. 2 shows an exploded view of that shown in FIG. 1.

FIG. 2 shows an explosive view of the object shown in FIG. 1. Both longitudinal sections 10 and 22 have the same appearance and exhibit two wall faces 14 and two connecting sides 12, the connecting side 12 being formed by an undercut groove 24 which is undercut on both sides and features a longitudinal opening 26. Strips 28 are formed by the undercut groove 24. On each connecting side 12 a distance from the strips 28 are struts 32 on each which join the wall sides 14 to each other and close off the undercut groove 24 on the side away from the longitudinal opening. The parts of the wall sides 14 standing up from the strips 28 form the longitudinal flanges 30. The distance between the flanges 30 in section 10 is the same as that in section 22.

The faces 66 of the connecting element 60 on the side towards the walls 14 run e.g. parallel to the walls 14 of the longitudinal sections 10, 22 or the connecting element 60 has e.g. a blunted cone shape such that the breadth of the connecting element 60 tapers from the base 61 towards the top surface 63. The breadth d of the connecting element 60 is smaller than the spacing between the longitudinal flanges 30; the connecting element is therefore displaceable on the section strips. The faces 64 of the connecting element 60 on the connecting side is of such a shape that it can fit by virtue of shape to the defined rounding of the bend in the angle piece i.e. the said faces 64 of the connecting element 60 are domed concave inwards, and the radius corresponds to that of the angle piece. As a result of the concave shape of the end faces 64, the connecting element 60 exhibits a top face 63 which is shorter than the base 61. The length of the top face 63 corresponds usefully to the breadth f of the end 16 of the transversely cut section 10. The length c of the base 61 is therefore longer than that of the top surface 63 and is determined by the length of the top surface 63 and the concave curvature of the face 64 of the connecting element 60. The height of the connecting element 60 is greater than the height of the longitudinal flange 30 of the longitudinal section 22. The difference between the height e of the connecting element 60 and the height of the longitudinal flange 30 is designated the extra height a of the connecting element 60. This extra height of the connecting element 60 is preferably more than 1.5 mm and, in particular, between 1.5 and 4.5 mm. The connecting element 60 shown in FIG. 2 exhibits additionally on its base 61 an integral spring 62, which fits into the longitudinal opening 26 of the undercut groove 24.

The transversely cut longitudinal section 10 exhibits an end recess 18 which affects the strips 28 and the struts 32 of the section 10 in the region of the end face 16 i.e. essentially the whole of the end region between the wall sides 14 of the longitudinal section 10, as a consequence of which free standing ends of the wall sides 14, the so called end flanges 20 are produced in the end region of section 10. The height b of the end flanges is preferably 2 mm or more, in particular 2 to 5 mm, so that the section 10 is supported by its end flanges 20 on the longitudinal flanges 30 of section 22.

As shown in FIG. 2 are two angle pieces 40 for mechanically securing the longitudinal section 10 positioned by the connecting element 60. The angle pieces 40 exhibit two arms 42 at an angle to each other, each arm 42 featuring two holes 44 that are spaced apart and are for screws 50. The breadth of the arms 42 is less than the distance between the longitudinal flanges 30 so that the angle pieces 40 can be introduced into the groove like recesses 34 on the connecting sides 12. The thickness of the arms 42 is preferably chosen such that the arm 42 lies flush with the upper edge of the flange 30.

The attachment of the angle pieces is preferably performed via two clamp-screw connections per arm 42, the screws 50 each engaging in the thread of a clamping platelet introduced from the front into the undercut groove 24. The arms 42 of the angle piece 40 may also feature spring-like projections that can be introduced into the longitudinal openings 26 of longitudinal sections 10, 22.

FIG. 3 shows exemplified embodiments of connecting elements 60. The connecting element 60 shown in FIG. 3a exhibits, on both wall side faces 66, grooves 69 and lobe-shaped projections 68. This design of connecting element 60 permits high load transfer from one longitudinal section to the other. The grooves 69 are designed in such a manner that the connecting element 60 can be introduced into recess 34 of section 22 with the grooves 69 accommodating the strips 28 of the undercut groove 24 of section 22. The lobe-like projections 68 provide additional sideways stability to connection according to the invention.

Figure 3A:
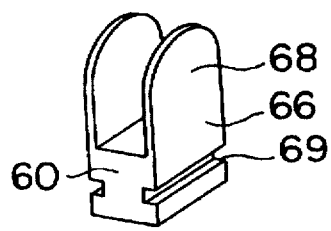
FIG. 3 shows various connecting elements in perspective view.
Figure 3B:
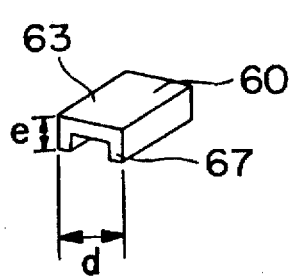
Figure 3C:
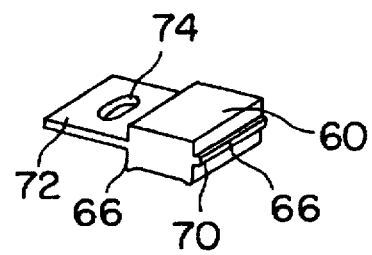
Figure 3D:
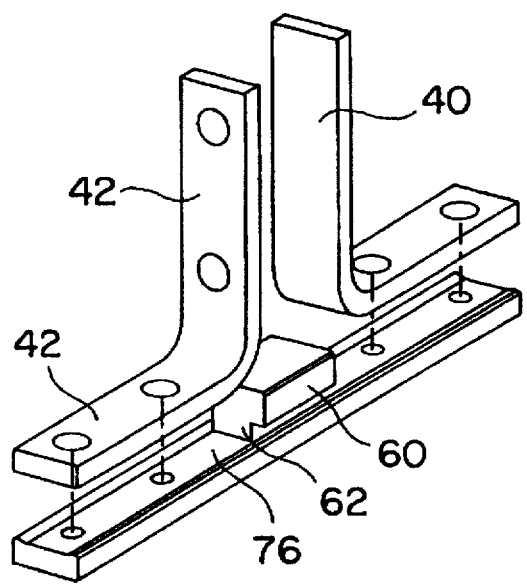

The connecting element 60 shown in FIG. 3b exhibits a simple U-shaped cross-section with flange 67. Such a connecting element 60 may be employed with the flanges on the strips 28 on the longitudinal section 22 or inverted i.e. with the top surface 63 on the section strips. The height e of the connecting element 60 is designed such that when the connecting element 60 is situated in the recess 34 in the longitudinal section 22, it projects at least 2 mm above the corresponding upper edge of the longitudinal flange 30.

The connecting element 60 shown in FIG. 3 c) exhibits a bulge shaped projection 70 on a face 66 that is directed at the wall side of the longitudinal sections, and on the opposite side an integral supporting bracket 72 with an attachment opening 74 to accommodate e.g. screws, rivets, bolts or clamping wedges. In a connection according to the invention employing such a connecting element 60, both projections on the wall side come to rest between the end flange 20 on the cross-cut section 10 and the corresponding longitudinal flange 30 on section 22. The bracket 72 serves to secure other components e.g. by means of screwing, riveting, clamping, soldering, welding or adhesive bonding, and permits these components to transfer a load directly into the connection according to the invention.

The connecting element 60 shown in FIG. 3 d) exhibits a spring 62 that can be introduced into the longitudinal opening 26 of section 22. Also shown—instead of the clamping platelet—is a continuous clamping strip 76 for joining the arms 42 to the longitudinal section 22.

FIG. 4 shows side views of connections according to the invention featuring different shapes of connecting elements 60. In all of the side views shown the cross-section of longitudinal section 22 is at the bottom and a section through the longitudinal section 10—showing only the wall faces 14—is in the upper part of the figure. The side view of section 22 corresponds to its short cross-section so that the undercut grooves 24 with longitudinal opening 26 and inward projecting flanges 30, struts 32 and strips 28 can be recognized.

The connecting element 60 shown in FIG. 4 a) exhibits two lugs 78 that can be introduced into the longitudinal opening 26 of the undercut groove 24. Such integral lugs 78 on the connecting element 60 are particularly suitable for clipping the connecting element 60 into the undercut groove 24.

FIG. 4 b) shows a connection with groove 69 and lobe-shaped projections 68 on the connecting element 60, and shows therefore in side view the connection of a pair of longitudinal sections 10, 22 made using a connecting element 60 as shown in FIG. 3 a).

FIG. 4 c) shows the side view of a connection according to the invention using a U-shaped connecting element 60, which is mounted with its flanges 67 on the strips 28 of section 22. Flanges 67 connect the longitudinal flange 30 of section 22 to the end flange 20 of section 10.

FIG. 4 d) shows the side view of a connection according to the invention between a pair of longitudinal sections 10, 22 employing a connecting element 60 that exhibits a groove 69 on each of its sides facing the walls, the said groove 69 having such a shape that the connecting element 60 can be introduced into the undercut groove 24. The connecting element 60. The connecting element 60 is introduced into section 22 with its grooves 69 accommodating the strips 28 of section 22. Forces acting sideways or vertically onto the connecting element 60 are therefore taken up by the groove/section-strip connection and transferred to the longitudinal section 22.

FIG. 4 e) represents a side view of a connection according to the invention employing a connecting element 60 as shown in FIG. 3 c). The connecting element 60 exhibits a bulge-shaped projection 70 and, on the opposite side an integral bracket 72. In the version shown in FIG. 4 e) the base 61 of the connecting element 60 is supported by the strips 28 on section 22. In this version the projections 70, 72 on the wall side come to rest between the end side flange 20 of the cross-cut section 10 and the longitudinal flange 30 of longitudinal section 22.

In a connection made according to the present invention between a longitudinally profiled section and the end face of a second longitudinal section situated at an angle to the first mentioned section the transfer of forces from one longitudinal section to the other takes place essentially by way of the connecting element, by means of which optimum transfer of forces is assured, especially when employing thin-walled sections.

Furthermore, the connection according to the invention makes it possible to join a pair of longitudinal sections at an angle to each other without elaborate working of the end face of the cross-cut section, as the connection according to the invention no longer requires a clean dividing line on the cross-cut section.

Also, the connection according to the invention make it possible to manufacture a tight connection between the sections that are joined, as the connecting element provides a contact interface large enough for a connecting mass to be applied.

We claim:

1. Connection structure which comprises: connection of two longitudinal sections that are at an angle to each other, each longitudinal section having two connecting sides and two wall sides, where at least one connecting side of each section exhibits between the two side walls a groove that is undercut on both sides and defines on both sides of the undercut groove an integral longitudinal flange and a section strip which forms a groove-like recess; wherein the first longitudinal section is cut transversely and the cross-cut section face forms an end face of the first longitudinal section which is secured at an angle to a connecting side of the second longitudinal section; and wherein the first longitudinal section exhibits a recess at its end, said recess extending over the entire length of the end face of each of the two wall sides and from said end face to an end of said section strips of said first longitudinal section; and a connecting element, that is introduced into the groove-like recess between the longitudinal flanges in the second longitudinal section, and which engages in this recess, as a result of which the connecting element forms a mechanical joint by virtue of fit with the end recess.

2. Connection according to claim 1, including a connecting mass for at least one of sealing the joint and to achieve an exact fit mechanical joint between the connecting element and the end recess provided between the connecting element and the end recess of the first longitudinal section.

3. Connection according to claim 2, including a connecting mass for at least one of sealing the joint and to achieve an exact fit mechanical joint between the connecting element and the end recess provided between the connecting element and the longitudinal flange of the second longitudinal section.

4. Connection according to claim 1, wherein the wall sides of the first longitudinal section include end flanges adjacent said recess, wherein said end flanges exhibit a height of at least 2 mm.

5. Connection according to claim 4, wherein said height is between 2 and 5 mm.

6. Connection according to claim 1, wherein the connecting element includes wall side faces adjacent the longitudinal flanges of the second longitudinal section, and wherein the height of each wall side face of the connecting element is greater by at least 1.5 mm than the height of the longitudinal flange of the second longitudinal section.

7. Connection according to claim 6, wherin the height of each wall side face of the connecting element is greater by 1.5 to 4.5 mm.

8. Connection according to claim 1, wherein the connecting element has a top surface, and wherein the top surface of the connecting element exhibits a length which corresponds to the length of the end face of the first longitudinal section.

9. Connection according to claim 1, wherein, in order to reinforce the connection, insertable angle pieces are provided between the connecting sides of the longitudinal sections in the groove-like recess in the sections, each angle piece exhibiting two arms at an angle to each other to define a curvature, and each arm of the angle piece is attached by at least one clamp-screw connecting means to the longitudinal sections where each screw engages in a thread in a clamping platelet that is introduced into the undercut groove, and each arm of the angle piece exhibits at least one hole to accommodate at least one screw that engages in the threads of the clamping platelets.

10. Connection according to claim 9, wherein the connecting element includes connecting side faces and wherein the connecting side faces of the connecting element exhibit a form that is congruent in a correlative manner with the curvature of the angle piece.

11. Connection according to claim 1, wherein, the connecting element is in the form of a U-shaped longitudinal section.

12. Connection according to claim 1, wherein, the connecting element exhibits on its base a spring-shaped projection that can be introduced into the undercut groove of the second longitudinal section.

13. Connection according to claim 1, wherein the connecting element includes two wall side faces and wherein the connecting element exhibits a groove on both wall side faces so that the connecting element can be inserted with the aid of its groove into the section strips formed by the undercut groove in the second longitudinal section.

14. Connection according to claim 1, wherein the connecting element includes wall side faces, and wherein the connecting element exhibits lobe-shaped projections on its wall side faces.

15. Connection according to claim 1, wherein the connecting element includes two wall side faces opposite each other, and wherein the connecting element exhibits a bulge-shaped projection on one of its wall side faces and an integral supporting bracket on the opposite wall side face.

* * * * *